US012572864B2

(12) United States Patent
Brockhurst et al.

(10) Patent No.: US 12,572,864 B2
(45) Date of Patent: Mar. 10, 2026

(54) AVOIDING PROHIBITED SEQUENCES OF MATERIALS PROCESSING AT A CRUSHER USING PREDICTIVE ANALYTICS

(71) Applicant: Caterpillar Inc., Peoria, IL (US)

(72) Inventors: Russell A. Brockhurst, Carindale (AU); Mark H. C. Banham, Victoria Point (AU); John S. Harpour, Thornlands (AU); Carla L. Wesley, Samford Village (AU)

(73) Assignee: Caterpillar Inc., Peoria, IL (US)

( * ) Notice: Subject to any disclaimer, the term of this patent is extended or adjusted under 35 U.S.C. 154(b) by 566 days.

(21) Appl. No.: 17/659,077

(22) Filed: Apr. 13, 2022

(65) Prior Publication Data

US 2023/0334390 A1      Oct. 19, 2023

(51) Int. Cl.
| | |
|---|---|
| *G06Q 10/06* | (2023.01) |
| *G06Q 10/0631* | (2023.01) |
| *G06Q 10/0633* | (2023.01) |
| *G06Q 50/40* | (2024.01) |

(52) U.S. Cl.
CPC . *G06Q 10/06312* (2013.01); *G06Q 10/06316* (2013.01); *G06Q 10/0633* (2013.01); *G06Q 50/40* (2024.01)

(58) Field of Classification Search
CPC .................................................... G06Q 10/06
See application file for complete search history.

(56) References Cited

U.S. PATENT DOCUMENTS

| | | | |
|---|---|---|---|
| 5,961,560 A * | 10/1999 | Kemner | G05D 1/0297 |
| | | | 710/39 |
| 6,529,812 B1 | 3/2003 | Koehrsen et al. | |
| 6,741,921 B2 | 5/2004 | Cohen et al. | |
| 10,330,481 B2 | 6/2019 | Lewis et al. | |

(Continued)

FOREIGN PATENT DOCUMENTS

| | | | | |
|---|---|---|---|---|
| AU | 2008213178 A1 * | 8/2009 | | B02C 2/042 |
| AU | 2018307077 A1 | 2/2020 | | |

(Continued)

OTHER PUBLICATIONS

S.G. Ercelebi, and A. Bascetin, Optimization of shovel-truck system for surface mining, The Journal of the Southern African Institute of Mining and Metallurgy, vol. 109, Jul. 2009. (Year: 2009).*

(Continued)

*Primary Examiner* — Kurtis Gills

(57) ABSTRACT

A method may include receiving, from at least one first machine, telemetry data. The at least one first machine may be operable to transport materials from at least one material source location to at least one material destination location. The method may further include sending at least one command to at least one machine based on whether a predicted sequence of processing of materials by at least one second machine at the at least one material destination location violates at least one prohibited sequence of processing. The predicted sequence of processing may be based on at least one of: a predicted sequence of arrival of the at least one first machine at the at least one material destination location, material attribute data, destination queue data, or a score for the predicted sequence of arrival.

20 Claims, 3 Drawing Sheets

(56) References Cited

U.S. PATENT DOCUMENTS

| | | | |
|---|---|---|---|
| 2008/0282583 A1 | 11/2008 | Koellner et al. | |
| 2013/0214585 A1* | 8/2013 | Zimmerman | E21F 13/00 |
| | | | 241/101.5 |
| 2015/0122920 A1 | 5/2015 | Dallimore et al. | |
| 2016/0326723 A1* | 11/2016 | Behmlander | G01N 29/043 |
| 2018/0182248 A1* | 6/2018 | Kanai | G08G 1/207 |
| 2018/0347333 A1* | 12/2018 | Cleminson | E21B 43/29 |
| 2019/0128680 A1 | 5/2019 | Lewis et al. | |
| 2020/0132882 A1 | 4/2020 | Runkana et al. | |
| 2021/0117878 A1 | 4/2021 | Subramanian et al. | |
| 2021/0118066 A1 | 4/2021 | Walker et al. | |
| 2021/0318666 A1 | 10/2021 | Brockhurst | |
| 2021/0325899 A1 | 10/2021 | Grambihler et al. | |
| 2021/0334720 A1 | 10/2021 | Brockhurst et al. | |
| 2023/0008357 A1* | 1/2023 | Kalvenes | B01F 23/69 |
| 2023/0267390 A1* | 8/2023 | Song | G06Q 10/06312 |
| | | | 705/7.22 |
| 2024/0168467 A1* | 5/2024 | Kotriwala | G06Q 10/0637 |

FOREIGN PATENT DOCUMENTS

| | | | |
|---|---|---|---|
| CN | 112718224 A | 4/2021 | |
| JP | H01168363 A | 7/1989 | |
| WO | WO-2021216481 A1 * | 10/2021 | G06Q 10/06313 |
| WO | WO-2022035441 A1 * | 2/2022 | |

OTHER PUBLICATIONS

Written Opinion and International Search Report for Int'l. Patent Appln. No. PCT/US2023/018012, mailed Jul. 28, 2023 (9 pgs).

\* cited by examiner

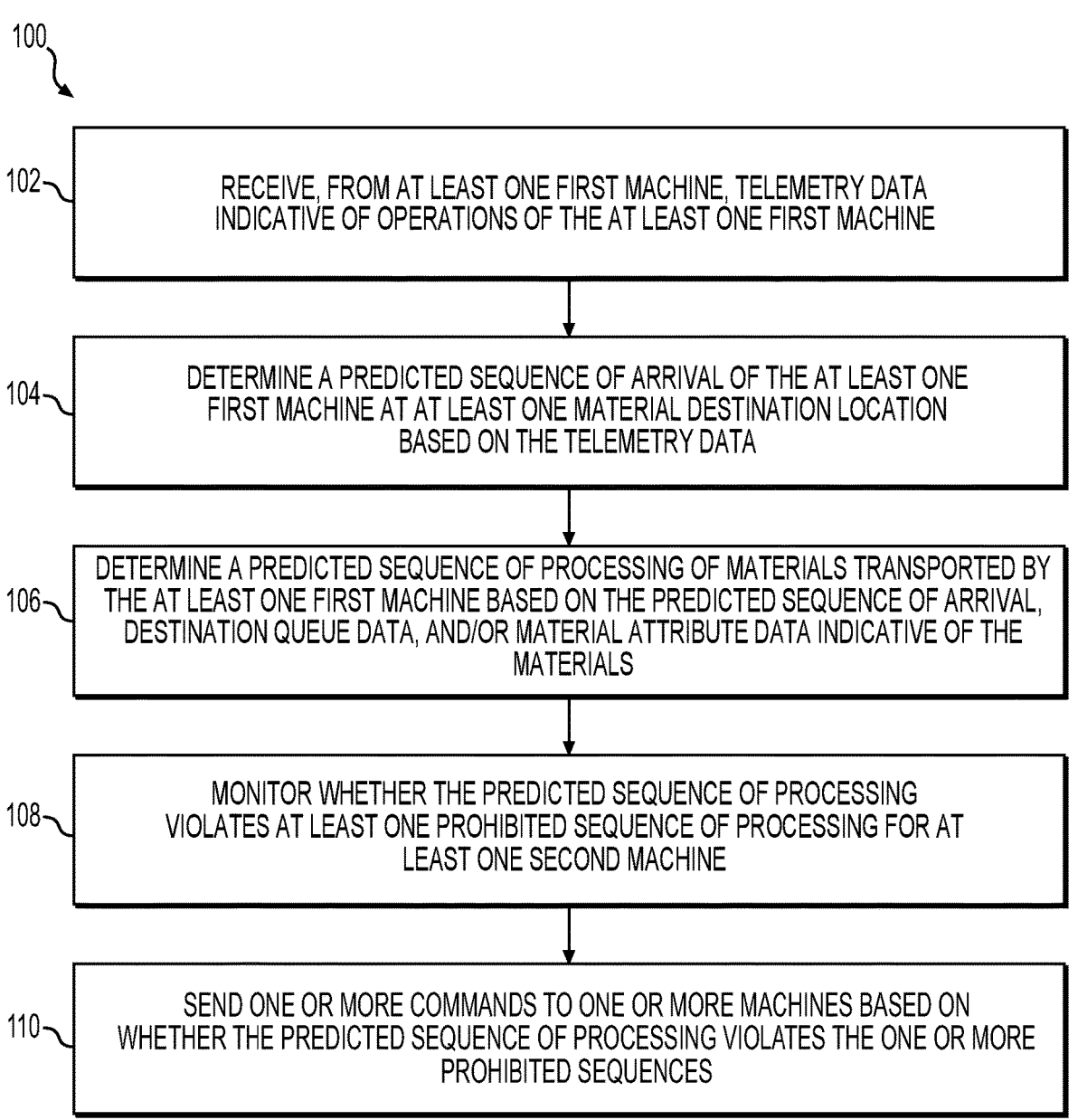

100

102 — RECEIVE, FROM AT LEAST ONE FIRST MACHINE, TELEMETRY DATA INDICATIVE OF OPERATIONS OF THE AT LEAST ONE FIRST MACHINE

104 — DETERMINE A PREDICTED SEQUENCE OF ARRIVAL OF THE AT LEAST ONE FIRST MACHINE AT AT LEAST ONE MATERIAL DESTINATION LOCATION BASED ON THE TELEMETRY DATA

106 — DETERMINE A PREDICTED SEQUENCE OF PROCESSING OF MATERIALS TRANSPORTED BY THE AT LEAST ONE FIRST MACHINE BASED ON THE PREDICTED SEQUENCE OF ARRIVAL, DESTINATION QUEUE DATA, AND/OR MATERIAL ATTRIBUTE DATA INDICATIVE OF THE MATERIALS

108 — MONITOR WHETHER THE PREDICTED SEQUENCE OF PROCESSING VIOLATES AT LEAST ONE PROHIBITED SEQUENCE OF PROCESSING FOR AT LEAST ONE SECOND MACHINE

110 — SEND ONE OR MORE COMMANDS TO ONE OR MORE MACHINES BASED ON WHETHER THE PREDICTED SEQUENCE OF PROCESSING VIOLATES THE ONE OR MORE PROHIBITED SEQUENCES

*FIG. 3*

AVOIDING PROHIBITED SEQUENCES OF MATERIALS PROCESSING AT A CRUSHER USING PREDICTIVE ANALYTICS

TECHNICAL FIELD

The present disclosure relates generally to avoiding prohibited sequences of materials processing at a crusher, and more particularly, to avoiding prohibited sequences of materials processing at a crusher using predictive analytics.

BACKGROUND

In the mining industry, crushers may break large material (e.g., ore) particles into smaller ore particles using mechanical force for subsequent processing. Since the size reduction associated with any individual crusher may be limited, blasts may be designed to produce particle sizes that are as close as possible to the size required for processing. In some scenarios, mine sites may use more than one crusher in sequence (e.g., primary, secondary, tertiary, quaternary, etc. crushers) to break ore particles down to the required size.

Crushers may have some limitations with respect to the material qualities they can handle. For example, a moisture level of the material, size of the material particles (e.g., fine versus coarse), pH of the material, etc. may negatively affect the processing performance of a crusher. In some cases, it may take several hours or even days to restore normal operations where a crusher breaks down after being fed a high concentration of material with certain material qualities (e.g., material that is too wet, sticky, hard, abrasive, large, or small). Monitoring the material that is input to a crusher is an important aspect of material processing as a number of the factors that affect the crusher's ability to process material cannot be adequately controlled through blast design. For example, blasting may be ineffective at removing moisture from ore located below a water table.

Primary crushers may often be fed using mining haul trucks, which may tip their loads into the crusher using one or more dump pockets associated with the crushers. The sequence in which mining haul trucks tip different materials into the crusher may determine the overall material qualities of the material in the crusher. Where mining haul trucks can tip material in random sequences, the qualities of the material in the crusher may exceed the capabilities of the crusher from time-to-time causing it to break down. A sequence that is likely to cause a crusher to break down is called a "prohibited sequence."

There are several conventional techniques for sequencing trucks for dumping at a crusher. For example, these techniques may include sending trucks to a park-up location, diverting trucks to a stockpile, or holding trucks at an intersection to delay their arrival at the crusher. However, these techniques waste productive capacity as they may be limited with respect to scalability due to space limitations. For example, a park-up location cannot be used for sequencing once all of the parking spaces are occupied and diverting trucks to stockpiles may increase fuel consumption or increase material re-handling costs.

U. S. Patent Application Publication No. 20210118066A1, published on Apr. 22, 2021 ("the '066 publication"), describes methods and systems for the batch delivery of material to a continuous material processor. The '066 publication describes a method to direct the movement of haul trucks between a loading area and an ore crusher. The method predicts the state of the crusher at one or more future times based on the predicted number of haul trucks at the crusher as well as the level of the crushed material predicted to be in the surge bin at the future times. These predictions, in conjunction with the estimated idle times, may be used to direct the movement of the haul trucks to minimize the idle time and/or the time when the crusher will be in a no-material state. However, the '066 publication does not disclose, for example, among other things, avoiding prohibited sequences of materials processing at a crusher using predictive analytics.

The system of the present disclosure may solve one or more of the problems set forth above and/or other problems in the art. The scope of the current disclosure, however, is defined by the attached claims, and not by the ability to solve any specific problem.

SUMMARY

In one aspect, a system may comprise at least one first machine operable to transport materials from at least one material source location to at least one material destination location, at least one second machine operable to process the materials at the at least one material destination location, and a control system. The control system may be configured to receive, from the at least one first machine, telemetry data indicative of operations of the at least one first machine and determine a predicted sequence of arrival of the at least one first machine at the at least one material destination location based on the telemetry data and determine a score for the predicted sequence of arrival. The control system may be further configured to determine a predicted sequence of processing of the materials at the at least one material destination location based on: material attribute data indicative of the materials transported by the at least one first machine, the predicted sequence of arrival, destination queue data indicative of a queue of first machines at the at least one material destination location, or the score for the predicted sequence of arrival. The control system may be configured to monitor whether the predicted sequence of processing violates at least one prohibited sequence of processing for the at least one second machine and send at least one command to at least one machine based on whether the predicted sequence of processing violates the at least one prohibited sequence of processing.

In another aspect, a method may include receiving, from at least one first machine, telemetry data indicative of operations of the at least one first machine. The at least one first machine may be operable to transport materials from at least one material source location to at least one material destination location. The method may further include sending at least one command to at least one machine based on whether a predicted sequence of processing of materials by at least one second machine at the at least one material destination location violates at least one prohibited sequence of processing. The predicted sequence of processing may be based on at least one of: a predicted sequence of arrival of the at least one first machine at the at least one material destination location, material attribute data indicative of the materials transported by the at least one first machine, destination queue data indicative of a queue of first machines at the at least one material destination location, or a score for the predicted sequence of arrival.

In yet another embodiment, a control system for materials dumping during mining operations may be configured to receive, from at least one first machine, telemetry data indicative of operations of the at least one first machine. The at least one first machine may be operable to transport materials from at least one material source location to at least one material destination location. The control system may be further configured to determine a predicted sequence of arrival of the at least one first machine at the at least one material destination location based on the telemetry data and determine a score for the predicted sequence of arrival. The control system may be further configured to determine a predicted sequence of processing of the materials by at least one second machine at the at least one material destination location based on: material attribute data indicative of the materials transported by the at least one first machine, the predicted sequence of arrival, destination queue data indicative of a queue of first machines at the at least one material destination location, or the score for the predicted sequence of arrival. The control system may be further configured to monitor whether the predicted sequence of processing violates at least one prohibited sequence of processing for the at least one second machine and send at least one command to at least one machine based on whether the predicted sequence of processing violates the at least one prohibited sequence of processing.

Other features and aspects of this disclosure will be apparent from the following description and the accompanying drawings.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 illustrates a flowchart depicting an exemplary method for avoiding prohibited sequences of materials processing at a crusher using predictive analytics, according to aspects of the disclosure.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Figure 1:
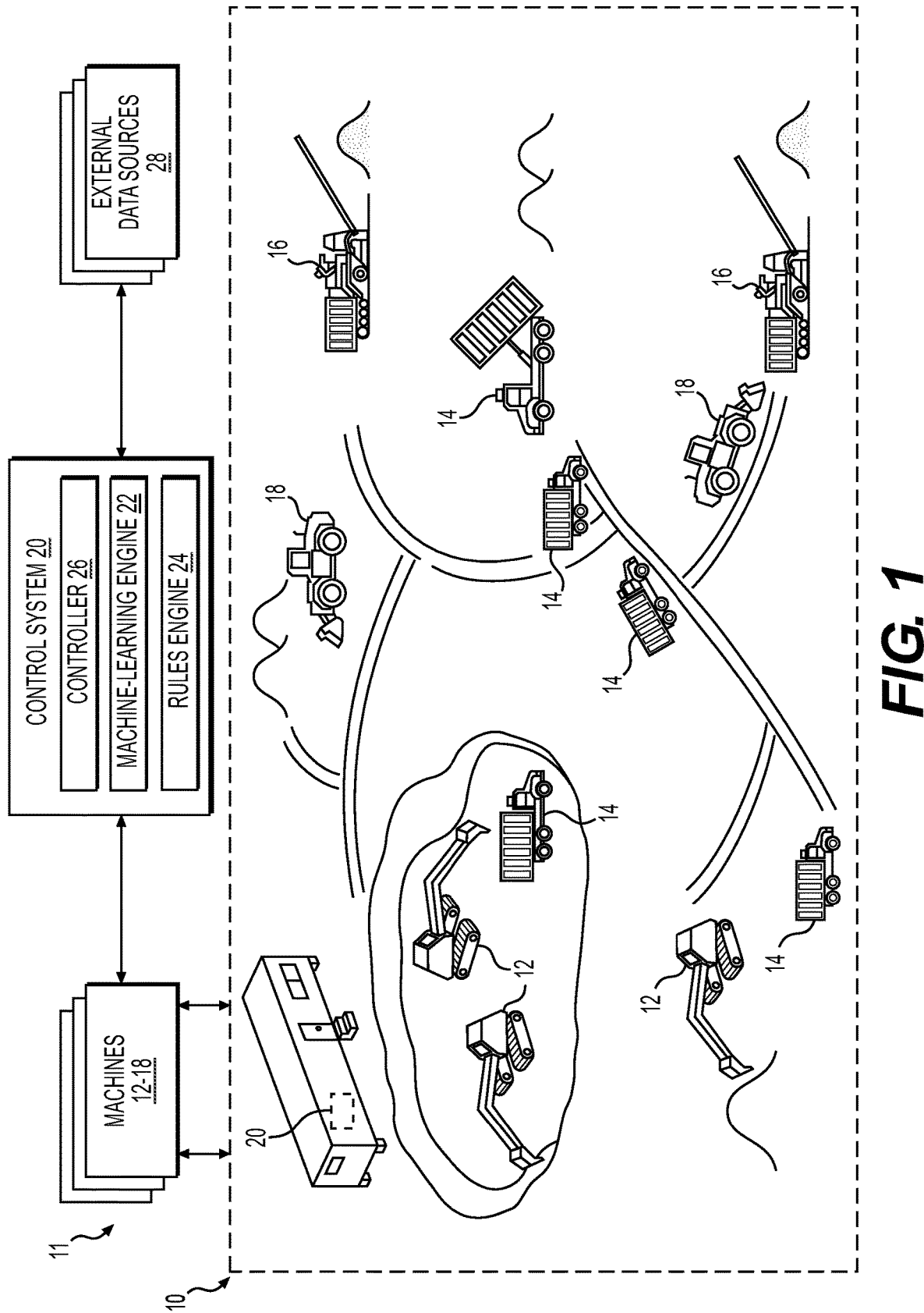
FIG. 1 is a schematic diagram of an exemplary environment including a physical environment with materials and machines and a related computing system for monitoring and/or controlling the machines, according to aspects of the disclosure.

FIG. 1 is a schematic diagram of an exemplary environment including a physical environment 10 with materials and machines and a related computing system 11 for monitoring and/or controlling the machines, according to aspects of the disclosure. The physical environment 10 is shown as a mining location at which a number of machines 12-18 are used to dig, transport, and process source materials (e.g., ore). The computing system 20 is shown as including the machines 12-18, a control system 20 that monitors and controls the operations of the machines 12-18 to manage the characteristics of a material blend, and external data sources 28. The control system 20 receives and analyzes data from the machines 12-18, such as telemetry data and other sensor data, as well as data from the external data sources 28. For instance, in addition to sensor data from a particular machine 12-18, the control system 20 may receive detailed material attribute data from the external data sources 28.

The physical environment 10 depicted in FIG. 1 schematically illustrates various operational mining scenarios for extracting materials from material source locations (e.g., mining blocks, stockpiles, or intermediate stockpiles) using excavators 12, and transporting the materials using mining haul trucks 14 to material destination locations, such as crushers 16, dump sites, and/or the like. FIG. 1 illustrates additional mining scenarios in which wheel loaders 18 may load material from a stockpile and dump the material directly into a crusher 16. In some examples, a material destination location (e.g., a stockpile) can act as an intermediate material source before the material is transported to a final material destination location (e.g., a crusher 16) at the mine site. Various operational scenarios may be implemented within the physical environment 10, including different material source or destination cardinalities, source material types, machine types, different blends at different crushers 16, etc.

Additional or alternative operations performed at the site may include tunnel mining, blasting, and/or other mining or landscaping operations. Although the physical environment 10 is illustrated as a mining location in this example, the techniques described herein apply to other physical environments and geographic areas, such as paving sites, industrial sites, factory floors, building construction sites, road construction sites, quarries, and/or the like. Moreover, features of the physical environment 10 may change over time, e.g., as the physical environment 10 changes from mining, digging, grading, and/or other machine-based actions and/or because of erosion or other natural changes.

As noted above, FIG. 1 illustrates a variety of machines performing mining tasks, including excavators 12 digging materials at material source locations, trucks 14 and wheel loaders 18 performing hauling and dumping operations throughout the physical environment 10, and crushers 16 receiving and processing various blends of materials. The machines shown in FIG. 1 are illustrative, and various types of machines such as earth-moving machines (e.g., wheel loaders, dump trucks, backhoes, bulldozers, or material handlers), tankers for carrying water or fuel, over-the-road vehicles, work machines (e.g., pavers or compactors), and/or the like may be present in the physical environment 10. Moreover, different locations or types of physical environments may include different combinations of machines, and the techniques described herein apply similarly to these different locations/physical environments. As used herein, the term "machine" refers to any type of mechanical apparatus that performs operations associated with a given industry, such as mining, construction, farming, transportation, oil and gas, manufacturing, or any other industry. Throughout this disclosure, for simplicity, machines including the excavators 12, trucks 14, crushers 16, and wheel loaders 18, and other machines may be referred to collectively as "machines 12-18."

In some examples, the tasks, jobs, or operations performed in the physical environment 10 may be partially or completely autonomous. For instance, certain machines 12-18 may include automated components, internal rules engines 24 and/or machine-learning engines 22 to autonomously perform operations in response to conditions detected by the machines 12-18. However, machine operators or other personnel may also be present to control the machine operations in some examples. For instance, operators within the machines 12-18 may directly control the machines using on-board controls and/or remote operators at separate locations (e.g., workstations) may remotely control the machines 12-18 via wired and/or wireless communications systems. Although several examples of operations, tasks, or jobs performed by the machines 12-18 and/or personnel are described herein, these examples are illustrative and non-limiting, and the techniques described herein may be used to perform any machine operation. In some instances, machines 12-18 may be controlled based on data from various data sources to perform operations activating any of the controls of the machines 12-18, and/or operations monitoring or overseeing the machines 12-18 or the physical environment 10 (e.g., to identify obstacles or machine malfunctions). For example, the machines 12-18 may receive operating instructions from the control system 20 to extract, haul, and/or process materials, in order to manage the characteristics of a material blend.

Certain machines 12-18 may be configured with or otherwise have access to sensing components and wired and/or wireless communications systems. In some cases, accompanying sensing components and communications systems may be used by in-person and/or remote operators to control the machines 12-18. For example, the machines 12-18 may include transceiver systems including antennas or other network components to facilitate wireless communication (e.g., via radio frequency (RF) signals, via a wireless network, such as a local area network (LAN) or a wide-area network (WAN)), or any other communications protocols. The machines 12-18 may be configured to communicate with a central hub, such as the control system 20, where the central hub is configured to receive communications from the machines 12-18 and transmit or re-route communications to other machines 12-18 or other external systems. In some examples, the machines 12-18 may transmit individual communications to the central hub in real-time or near real-time. In other examples, the machines 12-18 may record and store a group of multiple communications, and then transmit the group of communications to the central hub in a batch. In such examples, the batching and periodic transmission of communications from the machines 12-18 may cause the control system 20 to receive data at different times and/or in different phases. Additionally or alternatively, the machines 12-18 may include communications systems configured to communicate directly with other machines 12-18 (e.g., via a distributed network). Hybrid networks and/or different communications networks and protocols may be alternatively used, and this disclosure is not dependent upon a single arrangement, technology or protocol.

In some examples, the machines 12-18 may also include, or be associated with, user devices, such as mobile phones, tablet devices, radios, headsets, and/or other similar electronic devices, configured to enable communication between the machines 12-18 (or an operator of the machines 12-18) and remote systems or devices, or personnel at a remote location. In some examples, operators at a mining site may use various user devices to monitor data described herein, to control the machines 12-18, to generate data used by the control system 20, and/or the like.

As illustrated in FIG. 1, the physical environment 10 may be associated with a computing system 11. The computing system 11 may include the control system 20 having hardware and/or software-based components for monitoring, controlling, and communicating with the machines 12-18 in the physical environment 10. The control system 20 may include one or more server devices (e.g., distributed across one or more data centers), processors, and/or memory. In the illustrated example, the memory of the control system 20 may store software-based components to perform various processes and techniques described herein of the control system 20, including a machine-learning engine 22, a rules engine 24, and a controller 26.

A processor may include a central processing unit (CPU), a graphics processing unit (GPU), a microprocessor, a digital signal processor and/or other processing units or components. Additionally, or alternatively, the functionality described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, the processor may possess its own local memory, which also may store program modules, program data, and/or one or more operating systems. The processor may include one or more cores.

Memory may be a non-transitory computer-readable medium that may include volatile and/or nonvolatile memory, removable and/or non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, redundant array of independent disks (RAID) storage systems, or any other medium which can be used to store the desired information and which can be accessed by a computing device (e.g., a user device, a server device, etc.). The memory may be implemented as computer-readable storage media (CRSM), which may be any available physical media accessible by the processor to execute instructions stored on the memory. The memory may have an operating system (OS) and/or a variety of suitable applications stored thereon. The OS, when executed by the processor, may enable management of hardware and/or software resources of the controller 26.

In some examples, the controller 26 may control operations of the machine-learning engine 22 and/or the rules engine 24. For example, the controller 26 may cause the machine-learning engine 22 to execute one or more trained machine-learned models based on the data received from the machines 12-18 and/or the external data sources 28, and may control the rules engine 115 to determine whether a sequence of materials to be processed is a prohibited sequence of materials (or an allowed or target sequence of materials). The control system 20 in the example of FIG. 1 may be implemented within an on-site workstation, such as an office, a building, a vehicle, and/or the like, where one or more remote operators may be situated. For example, the workstation may include one or more offices in which a supervisor, a foreman, and/or different personnel are stationed. In some implementations, the workstation may act as a hub, for example, including the control system 20 and serving as a location from which the various machines 12-18 are controlled. In this example, the control system 20 may be configured to implement some or all of the processes and techniques described herein. However, although FIG. 1 illustrates the control system 20 as associated with a workstation in the physical environment 10, the workstation and/or control system 20 may be located off-site or in a different location in various examples. For instance, the control system 20 may be implemented as a remote computing system, a cloud-based computing system, or another computing system configured to communicate with the machines 12-18 via one or more networks.

As described in more detail below, the control system 20 may monitor and/or track the extraction, movement, and processing of materials performed by the various machines 12-18 within the physical environment 10. For instance, the control system 20 may track the attributes and/or arrival time of the incoming materials being transported to a crusher 16, where the blend of materials may be an aggregate of incoming material from multiple loads. In some cases, a target material blend or prohibited material blends may be described using a collection of constraints (e.g. minimum and maximum thresholds defining a target range) for various material attributes over time or by mass. In some embodiments, the control system 20 may monitor movement of the machines 12-18 (e.g., based on location sensor data received from the machines 12-18, or other monitoring sensors/cameras in the physical environment 10), may track a material blend at a crusher 16, and may determine (or modify) operating instructions for the machines 12-18 to maintain the material blend within a target blend range.

In more detail, FIG. 1 schematically illustrates that the control system 20 receives data from the machines 12-18 within the physical environment 10 and/or the external data source(s) 28. The data that the control system 20 may receive and/or process may include telemetry data indicative of operations of the machines 12-18, material attribute data indicative of the materials transported by the machines 12-18, sensor data from sensors on the machines 12-18 and/or located throughout the physical environment 10, and/or the like, as described in more detail herein. In some embodiments, other types of data may be used in combination with, or in place of, the data described herein.

Figure 2:
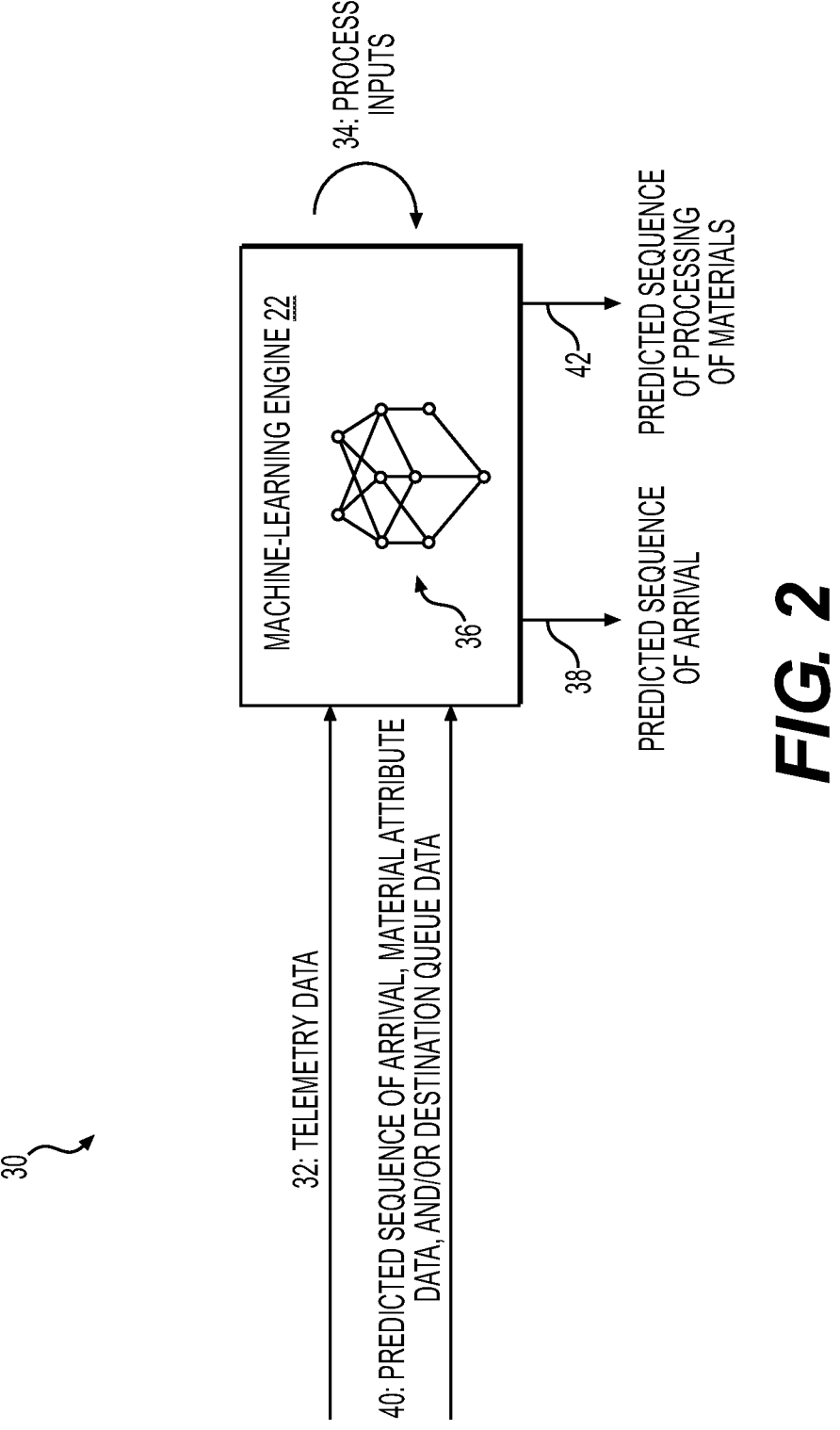
FIG. 2 is a schematic diagram of an example where the machine-learning engine of FIG. 1 receives data from machines and/or external data sources of FIG. 1, according to aspects of the disclosure.

FIG. 2 is a schematic diagram of an example 30 where the machine-learning engine 22 of FIG. 1 receives data from the machines 12-18 and/or the external data sources 28 of FIG. 1, according to aspects of the disclosure. As illustrated at 32, the machine-learning engine 22 may receive telemetry data. For example, the control system 20 may receive the telemetry data from the machines 12-18 and/or the external data sources 28 and may provide the telemetry data to the machine-learning engine 22. In some embodiments, the machine-learning engine 22 may receive the telemetry data directly from the machines 12-18 and/or the external data sources 28.

The telemetry data for a machine may include data indicative of (or representing) any operations performed by the machines 12-18. For instance, for a digging machine such as an excavator 12, the telemetry data includes data describing any movements of the excavator 12 (e.g., forward and backward movements, rotational movements, etc.) and the movement and actions of the digging arm (e.g., extending, contracting, scooping, performing "a dipper" action to empty its bucket, etc.), and/or the like. For a truck 14 or other hauling machine, the telemetry data may include data describing the locations and/or movements of the truck 14 (e.g., forward and reverse driving, driving speeds and directions, etc.), and the movements and actions of the dump body (e.g., extending pistons to tip the dump body, contracting the pistons to return the dump body to a flat position, opening or closing an automated tailgate, etc.), and/or the like. For a crusher 16, the telemetry data may include data describing the activation and deactivation of the crusher (e.g., time, duration, etc. of the crushing), whether the crusher 16 is performing to expectations (e.g., in terms of processing volume for a time period, output material particle size, etc.), and/or the like.

The telemetry data may be received from a global positioning system (GPS) of the machines 12-18, from a sensor on the machines 12-18 (e.g., a sensor on an engine of the machines 12-18), a sensor at a mining site or along a path from one part of the mining site to another part of the mining site (e.g., radio frequency identification (RFID) transponders on the machine 12-18 may communicate with RFID receivers at the mining site to track movements of the machines 12-18), and/or the like. Additionally, or alternatively, cameras, microphones, motion sensing devices, and other types of environmental sensors may be used to gather the telemetry data. For example, cameras may be used to gather images of operations at a mining site and the control system 20 may process the images to track movements, locations, and/or operations of the machines 12-18. These examples of machines and associated telemetry data are illustrative, and the telemetry data received by the control system 20 may include any operational data, status data, or environmental data from the machines 12-18.

As illustrated at 34, the machine-learning engine 22 may process inputs using one or more models 36. For example, the machine-learning engine 22 may process the telemetry data received at 32 by executing the one or more models 36. A model 36 may be trained on training data to process input data to identify certain characteristics in the input data and may output information based on the characteristics. For example, and as illustrated at 38 for the data received at 32, the machine-learning engine 22 may execute a model 36 to determine a predicted sequence of arrival of various trucks 14 at a crusher 16 based on the telemetry data for the trucks 14. As a specific example, when the various trucks 14 are within a threshold distance (e.g., based on kilometers or meters, driving speed, etc.) from a crusher 16, the control system 20 may provide the telemetry data to the machine-learning engine 22 to determine a predicted sequence of arrival of the trucks 14 at the crusher 16 (e.g., the machine-learning engine 22 may determine a first, second, third, etc. truck 14 to arrive at the crusher 16).

As illustrated at 40, after the machine-learning engine 22 has determined the predicted sequence of arrival for the trucks 14, the machine-learning engine 22 may receive the predicted sequence of arrival, material attribute data, and/or destination queue data (e.g., data related to a queue of trucks 14 at a crusher 16) as input data. For example, the control system 20 may have stored the predicted sequence of arrival in memory and may access the predicted sequence of arrival in the memory to provide it to the machine-learning engine 22. The machine-learning engine 22 may receive the material attribute data and/or the destination queue data from sensors on the trucks 14 or at the mining site and/or from the external data sources 28. For example, the material attribute data may be based on data from weight sensors and/or pressure sensors that determine a weight of a current load of material carried by the truck 14, from location sensors indicating a location of loading of the material (e.g., the external data sources 28 may provide data on the moisture, pH, etc. of the material based on the material source location), from a user device of an operator at a material source location (e.g., the operator may inspect the material as it is being loaded onto the truck 14 and may input material attribute data to the user device), and/or the like.

As another example, the destination queue data may be based on GPS data from the trucks 14 in a queue at a crusher 16, sensors that count the number and/or positions of trucks 14 in the queue, input to a user device from an operator at the location of the queue (e.g., an operator may inspect the queue and may input data related to the number, identity, and/or order of trucks 14 in the queue), and/or the like.

The machine-learning engine 22 may, at 34, process the inputs received at 40 in a manner similar to that described above. For example, the machine-learning engine 22 may process the predicted sequence of arrival, the material attribute data, and/or the destination queue data by executing one or more models 36. For this processing, and as illustrated at 42, the one or more models 36 may be trained to determine a predicted sequence of processing of materials at a crusher 16. For example, the machine-learning engine 22 may use the predicted sequence of arrival and the destination queue data to determine an order in which the trucks 14 will likely dump their material into a crusher 16 and may then use the material attribute data to determine the predicted sequence of processing for the materials (e.g., to determine that materials with a certain moisture level from one truck 14 will likely be preceded or followed by materials with the same or a different moisture level). These and other operations are described in more detail with respect to FIG. 3.

The model(s) executed by the machine-learning engine 22 may be generated and/or trained based on training data. The training data may be based on, e.g., historical data gathered from monitoring the physical environment 10 and/or similar environments (e.g., other mining sites). In some cases, training data is generated in environments via a variety of data acquisition means (e.g., video monitoring, machine sensors, separate site monitoring sensors, and/or manual monitoring by operators). Various machine learning techniques may be employed to train machine-learning models based on the training data. In some examples, machine learning techniques may be employed to perform predictions of characteristics of material loads and/or machine activities, in physical environments 10 where less telemetry data is available to the control system 20, such as environments having fewer machine sensors, fewer site monitoring devices, no video monitoring/surveillance, no manual load monitoring/recording by operators, etc.

INDUSTRIAL APPLICABILITY

The disclosed aspects of the control system 20 of the present disclosure may be used to help avoid prohibited sequences of materials (or facilitate allowed or target sequences of materials) processing at a crusher 16 using predictive analytics. Thus, certain aspects described herein may provide various advantages to mining operations including, e.g., the operations of a crusher 16. For example, by predicting that the crusher 16 is to process a prohibited sequence based on the predicted sequence of processing and taking actions to prevent the processing, certain aspects may reduce or eliminate breakdowns of the crusher 16, may reduce or eliminate excessive wear on the crusher 16, and/or the like. This reduces or eliminates an amount of downtime for the crusher 16 for maintenance, helps to maximize a useful life of the crusher 16 by preventing premature failure, conserves costs or labor resources related to performing repair more frequently than expected, and/or the like.

Additionally, or alternatively, certain aspects may make decisions to re-queue trucks 14 at the time of dumping. This may reduce or eliminate a need to use park-up locations or manual sequencing at a junction point prior to dumping, which may conserve fuel of the trucks 14 by reducing or eliminating a need for the trucks 14 to idle in route to a material destination location or to detour to a junction point for sequencing with other trucks 14. In addition, this may also facilitate continuous processing at the crusher 16 by reducing or eliminating queueing delays at the crusher 16, which may improve an efficiency of mining operations.

Additionally, or alternatively, certain aspects may preemptively control material source location assignments for trucks 14 based on the predictions described herein as one way of controlling the blend of materials arriving at the crusher 16. For example, the control system 20 may monitor and predict the blend of materials to track variations or shifts in the composition of the blend over time and may assign a truck 14 to be loaded with materials from a certain material source location to re-balance the blend or to avoid having excessive unwanted qualities in the blend. This may reduce downtime of the crusher 16 due to breakdown or maintenance, may reduce an amount of time the truck 14 has to idle while waiting for an appropriate time to queue with other trucks 14 (as may be the case if the truck 14 is arbitrarily loaded with material from any material source location), and/or the like.

FIG. 3 illustrates a flowchart depicting an exemplary method 100 for avoiding prohibited sequences of materials processing at a crusher 16 using predictive analytics, according to aspects of the disclosure. Although certain embodiments are described as avoiding prohibited sequences of materials, certain embodiments may be applicable to facilitating allowed or target sequences of materials processing. The method 100 illustrated in FIG. 3 may be implemented by the control system 20 (e.g., the controller 26 of the control system 20). In some embodiments, the machine-learning engine 22 and/or the rules engine 24 may perform the method 100 (or certain steps of the method 100). The steps of the method 100 described herein may be embodied as machine readable and executable software instructions, software code, or executable computer programs stored in a memory and executed by a processor of the control system 20 (or the controller 26). The software instructions may be further embodied in one or more routines, subroutines, or modules and may utilize various auxiliary libraries and input/output functions to communicate with other equipment. The method 100 illustrated in FIG. 3 may also be associated with an operator interface (e.g., a human-machine interface, such as a graphical user interface (GUI)) through which an operator of a mining site may configure operations of the control system 20 (e.g., the manner in which the control system 20 performs various determinations and/or actions), may configure the machine-learning engine 22 (e.g., may tailor the models 36 to specific contexts), may configure the rules engine 24 with prohibited sequences, and/or the like. Therefore, the method 100 may be implemented by the control system 20 to provide for avoidance of prohibited sequences in materials processing. For example, the control system 20 may predict the occurrence of a prohibited sequence in materials processing for tucks 14 that are in a queue to dump at a crusher 16 (or within a threshold distance of entering the queue) and may take corrective actions to prevent one or more of the trucks 14 from dumping at the crusher 16 and/or to reconfigure the queue so that the sequence of materials processing is not a prohibited sequence. This may prevent damage to the crusher 16 that might otherwise occur as a result of processing a prohibited sequence of materials and/or may conserve fuel or time that might otherwise be wasted through trying to organize trucks 14 to avoid prohibited sequences prior to the trucks 14 joining the queue.

At step 102, the method 100 may include receiving, from at least one first machine, telemetry data indicative of operations of the at least one first machine. For example, the control system 20 may receive the telemetry data from the trucks 14 and may provide the telemetry data to the machine-learning engine 22, e.g., in a manner similar to that described above at 32 of FIG. 2. The control system 20 may receive the telemetry data based on requesting the telemetry data from the trucks 14, in a stream of data, according to a schedule, and/or the like. In some embodiments, the control system 20 may receive the telemetry data for any trucks 14 within a threshold proximity of a dump site or a crusher 16 (e.g., as determined from a GPS system, a navigation system, a geo-fencing system, etc.). In some embodiments, the control system 20 may receive the telemetry data from one or more sensors associated with a truck 14 (e.g., sensors on an engine, on wheels, etc. of the truck 14) or associated with the physical environment 10 (e.g., sensors that can detect the presence or movement of the truck 14 in a certain location within the physical environment 10).

The method 100 may include, at step 104, determining a predicted sequence of arrival of the at least one first machine at at least one material destination location based on the telemetry data. For example, the control system 20 may determine a predicted sequence of arrival of the trucks 14 at at least one material destination location based on the telemetry data, e.g., in a manner similar to that described above at 34 and 38 of FIG. 2. In some embodiments, the control system 20 may determine the predicted sequence of arrival for any trucks 14 within a threshold proximity of a dump site or a crusher 16.

When predicting the sequence of arrival, the control system 20 may execute (or cause the machine-learning engine 22 to execute) a model 36 to process the telemetry data. For example, the model 36 may process GPS coordinates, navigation data (e.g., a planned route of a truck 14, traffic along the route, an expected arrival at a material destination location, etc.), speed data, and/or the like and may output a prediction of the arrival time of a truck 14 at the material destination location. The control system may perform similar determinations for multiple trucks 14 in the physical environment 10 transporting various materials (or materials with various attributes) from multiple material source locations to multiple material destination locations. The control system 20 may then predict an order in which various trucks 14 may arrive at the material destination location based on the predicted arrival times for the various trucks 14. For example, the control system 20 may generate (or may execute the model 36 to generate) an ordered list of the trucks 14 and the predicted arrival times, e.g., from earliest arrival time to latest arrival time at a material destination location. Trucks 14 with the same arrival time may be ordered alphanumerically by identifier for the trucks 14 or according to another criteria. The model 36 may output the predicted sequence of arrival to the control system 20, e.g., via the machine-learning engine 22.

In some embodiments, the machine-learning engine 22 may output a score for the predicted sequence of arrival. For example, the score may indicate a likelihood or confidence level that the predicted sequence occurs (e.g., the more vehicles that are predicted to arrive at a material destination location at about the same time may result in a lower likelihood or confidence level). In this way, the control system 20 may use a probability calculation to determine the likely sequence of arrival times based on various inputs including machine learning models 36, predicted speeds, a site map of distances between physical locations, traffic patterns, delays, etc.

At step 106, the method 100 may include determining a predicted sequence of processing of materials transported by the at least one first machine based on the predicted sequence of arrival, destination queue data, and/or material attribute data indicative of the materials. For example, the control system 20 may determine the predicted sequence of processing of materials at a crusher 16 after determining the predicted sequence of arrival for trucks 14 at the crusher 16, e.g., in a manner similar to that described above at 34 and 42 of FIG. 2. In some embodiments, the control system 20 may determine the predicted sequence of processing of the materials for any trucks 14 within a threshold proximity of the crusher 16.

When determining the predicted sequence of processing of materials, the control system 20 may execute (or cause the machine-learning engine 22 to execute) a model 36 to process the predicted sequence of arrival, destination queue data indicative of the queue of trucks 14 at a crusher 16, and/or materials attribute data indicative of the materials. For example, the model 36 may process the destination queue data and the predicted sequence of arrival to determine a likely order (or multiple possible orders that may occur with a likelihood greater than a threshold) in which the trucks 14 are to dump material at a dump site or into a crusher 16. The model 36 may then correlate the material attribute data to each truck 14 to predict a sequence of attributes of the material dumped at the dump site or into the crusher 16. For example, the model 36 may correlate the material attribute data to each truck 14 using location data that indicates a material source location for material loaded into each truck 14 and location data that associates material attributes to various material source locations. Thus, the control system 20 may predict the sequence of material processed by the crusher 16 over time based on predicting the manner in which the attributes of the blend of materials may change over time as the crusher 16 processes materials from different locations.

In some embodiments, the machine-learning engine 22 may output a score for the predicted sequence of processing. For example, the score may indicate a likelihood or confidence level that the predicted sequence occurs (e.g., a lower likelihood or confidence level for a predicted sequence of arrival may result in a lower likelihood or confidence level for the predicted sequence of processing). In this way, the control system 20 may use a probability calculation to determine the likely sequence of processing based on various inputs including machine learning models 36, a predicted sequence of arrival, etc.

The method 100 may include, at step 108, monitoring whether the predicted sequence of processing violates at least one prohibited sequence of processing for at least one second machine. For example, the control system 20 may monitor whether the predicted sequence of material processing violates a prohibited sequence of material processing for a crusher 16 after determining the predicted sequence of processing. As a specific example, the control system 20 may monitor whether a predicted sequence of certain material attributes (e.g., moisture level) of material that the crusher 16 may process violates a prohibited sequence of material attributes. In some embodiments, the control system 20 may continuously or periodically monitor whether the predicted sequence of processing violates the one or more prohibited sequences (e.g., may continuously monitor as the predictions at steps 104 and 106 are updated for new trucks 14 added to the queue or after trucks 14 have dumped their material). Additionally, or alternatively, the control system 20 may perform the monitoring just for trucks 14 that are in a queue of trucks 14 for a dump site or a crusher 16. For example, the control system 20 may perform the predictions described above to attempt to identify possible issues prior to queuing of the trucks 14 or as the trucks 14 are queueing and may monitor the predicted sequence of processing once the queue of trucks 14 forms and as the trucks 14 move to a dumping location from the queue.

When monitoring the predicted sequence of processing, the control system 20 may provide the predicted sequence of processing to the rules engine 24 for processing. For example, the rules engine 24 may be configured with one or more prohibited sequences of processing stored in memory and the rules engine 24 may compare the predicted sequence of processing to the one or more prohibited sequences to try to identify a match. Additionally, or alternatively, and as another example, the rules engine 24 may use a model 36 to determine a likelihood of whether the predicted sequence of processing violates any of the prohibited sequences and may determine that the predicted sequence of processing matches a prohibited sequence when the likelihood exceeds a threshold.

The monitoring may include determining that a score for a predicted sequence of arrival or processing exceeds a threshold. For example, the rules engine 24 may determine that a predicted sequence of processing is a prohibited sequence and may determine that the likelihood of the predicted sequence of processing occurring exceeds a threshold. In this example, the control system 20 may determine to perform one or more actions (described in more detail below in connection with step 110) to reduce the likelihood that the predicted prohibited sequence occurs or to try to increase a likelihood that an allowed sequence occurs.

At step 110, the method 100 may include sending at least one command to at least one machine based on whether the predicted sequence of processing violates the at least one prohibited sequence. For example, the control system 20 may send the at least one command to one or more of the machines 12-18 and/or may perform one or more actions other than sending commands. The control system 20 may send a command or perform another action immediately upon determining that the predicted sequence violates or does not violate a prohibited sequence, at a scheduled time (e.g., at a time a truck 14 is predicted to dump its material), based on input from an operator of the control system 20, and/or the like.

When the control system 20 determines that the predicted sequence of processing violates a prohibited sequence, the control system 20 may send a command to prevent a truck 14 from dumping at a material destination location or into a crusher 16. For example, the control system 20 may send a command to a truck 14 to stop the dumper of the truck 14 from actuating when the truck 14 enters a dumping point from the queue, a command to cause the truck 14 to exit the dumping point without dumping the material, a command to cause the truck 14 wait at the exit of the dumping point for one or more other trucks 14 to enter the queue, a command to cause the truck 14 to rejoin the queue (e.g., after the one or more other trucks 14 carrying material with certain material attributes enter the queue), and/or the like. In this way, certain embodiments may prevent the dumping of material in a prohibited sequence and may utilize already available areas of a material destination location to help re-queue trucks 14. This may reduce or eliminate an amount of time that trucks 14 have to idle to queue trucks 14 for dumping and/or may reduce or eliminate a need for a mine site to have additional staging or idling areas.

When the control system 20 determines that the predicted sequence of processing does not violate a prohibited sequence, the control system 20 may send a command to cause a truck 14 to dump loaded material at a material destination location. For example, the control system 20 may send a command to cause the truck 14 to enter a dump point at a material destination location, a command to actuate the dumper of the truck 14, to exit the material destination location (with or without waiting at the exit for an amount of time), and/or the like. As other examples, the control system 20 may send a command to the unloaded truck 14 to drive to a material source location for loading (e.g., after the control system 20 assigns the truck 14 to a loading location based on the predicted sequence of processing after the truck 14 dumps its material), a command to an excavator 12 at the material source locations to load the truck 14 with an amount of material when the truck 14 arrives at the material source location, and/or the like. In this way, certain embodiments may try to proactively manage a blend of material entering a queue at a material destination location, which may reduce or eliminate a need to re-queue trucks 14, reduce or eliminate damage that might otherwise occur to a crusher 16, conserve fuel and/or time that might otherwise be consumed re-queuing a truck 14, and/or the like.

The control system 20 may send one or more other commands or perform other actions in some embodiments. For example, the control system 20 may send a command to a front loader 18 to load material from a pile of dumped material at the material destination location into the crusher 16. Additionally, or alternatively, the control system 20 may send a command to the crusher 16 to power on, a command to crush material that was dumped into the crusher 16, a command to power off, a command to stop crushing material when the control system 20 detects that a prohibited sequence of material may have been dumped into the crusher 16, and/or the like. Additionally, or alternatively, the control system 20 may output an alarm or message to a user device of an operator controlling machines 12-18 or an operator in a control center for a mining site.

In this way, if a sequence of processing based on probabilities may result in an undesired blend of materials, the control system 20 may send a command to stop or delay a truck 14's dumping, to change the probability of the arrival of the truck 14 at the crusher 16, and/or the like. Additionally, or alternatively, in this way, certain embodiments may use a probability model for determining the potential arrival sequence of a truck 14 based on various factors and may send commands to adjust upstream operations to change the probability of arrival or dumping in a desire sequence.

Although the method 100 illustrated in FIG. 3 is described as including steps 102 through 110, the method 100 may not include all of these steps or may include additional or different steps. For example, the method 100 may just include the operations at 106 through 110 based on the control system 20 determining a predicted sequence of processing for trucks 14 that are already queued.

Certain embodiments described herein may use predictive analytics to reduce the probability of processing prohibited sequences on different time horizons. For example, and as described above, certain embodiments may manage probabilities: 1) by assigning or reassigning empty trucks 14 to loading machines (e.g., by assigning empty trucks 14 to loading machines to maintain the correct mix of material qualities being mined); 2) by assigning full trucks 14 to crushers 16 (e.g., assigning full trucks 14 to crushers 16 to minimize the probability of trucks 14 arriving in a prohibited sequence); 3) by holding trucks 14 in the loading machine or crusher 16 exit lane for a period of time; 4) by holding trucks 14 at a decision point for a period of time; and 5) by sequencing trucks 14 at the crusher 16 to avoid prohibited sequences.

By avoiding prohibited sequences of materials processing using predictive analytics, certain embodiments described herein may provide real-time (or near real-time) management of material being fed (or staged to be fed) to a crusher 16, which may reduce or eliminate the likelihood that the crusher 16 processes a prohibited sequence of material. This may reduce or eliminate breakdowns or maintenance time for the crusher 16, may help to maximize a useful life of the crusher 16, and/or the like. In addition, certain embodiments may provide for re-queuing of trucks 14 based on detecting a prohibited sequence at the time of dumping (e.g., rather than queuing the trucks 14 in a permitted sequence prior to dumping). This may reduce or eliminate an amount of time that trucks 14 have to idle while running in order to wait for other trucks 14 to queue before the truck joins the queue, which may conserve fuel of the trucks 14 and/or facilitate efficient use of the trucks 14. Additionally, or alternatively, this may reduce or eliminate a need for a mine site to have designated areas for the trucks 14 to idle while queuing occurs. By queuing the trucks 14 as they arrive at a crusher 16 and then re-queuing the trucks 14 on an as-needed basis at the time of dumping, certain embodiments may provide for a more continuous provisioning of materials to the crusher 16, which may reduce or eliminate an idle time of the crusher 16. This may increase an efficiency of mining operations at a mining site.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A system, comprising:
a first machine operable to transport materials from at least one material source location to a material destination location;
a second machine operable to process the materials at the material destination location;
a third machine operable to transport materials from the at least one material source location to the material destination location; and
a control system configured to:
receive, from the first machine and the third machine, telemetry data;
determine a predicted sequence of arrival of the first machine and the third machine at the material destination location based on the telemetry data;

determine a predicted characteristic of the materials transported by the first machine and the third machine based on the telemetry data;
determine a first predicted sequence of processing of the materials by the second machine based on at least the predicted sequence of arrival of the first machine and the third machine at the material destination location;
determine, based on the predicted sequence of arrival and the predicted characteristic of the materials transported by the first machine and the third machine, that the first predicted sequence of processing violates at least one prohibited sequence of processing for the second machine because the first predicted sequence of processing of the materials received from the first machine and the third machine would result in an attribute of a material blend being outside of a target range; and
send at least one command to at least one of the first machine or the third machine, to provide an expected sequence of arrival of the first and third machines at the second machine which is different than the predicted sequence of arrival,
wherein a second predicted sequence of processing, which is based on the expected sequence of arrival and the predicted characteristics of the materials transported by the first machine and the third machine, does not violate a prohibited sequence for processing for the second machine because the second predicted sequence of processing of the materials from the first machine and the third machine would result in the attribute of the material blend being within the target range.

2. The system of claim 1, wherein the control system is further configured, when determining the predicted sequence of arrival, to determine the predicted sequence of arrival for the first machine and the third machine that are within a threshold distance of the material destination location based at least in part on global positioning system (GPS) data from the first machine or the third machine.

3. The system of claim 1, wherein the control system is further configured, when determining the first predicted sequence of processing, to determine the first predicted sequence of processing when at least one of the first machine or the third machine joins a queue of machines at the material destination location.

4. The system of claim 1, wherein the control system is further configured, when sending the at least one command, to send a command to at least one of the first machine or the third machine to proceed to a dump site at the material destination location.

5. The system of claim 1, wherein the control system is further configured, when sending the at least one command, to send a command to at least one of the first machine or the third machine to exit the material destination location without dumping the materials.

6. The system of claim 1, wherein the at least one command comprises a command for the first machine to arrive at the material destination location prior to the third machine arriving at the material destination location, or for the third machine to arrive at the material destination location prior to the first machine arriving at the material destination location.

7. The system of claim 1, wherein the first machine comprises a mining truck, and
wherein the second machine comprises a crusher.

8. A method, comprising:

receiving, from a first machine and a third machine, telemetry data, the first machine and the third machine being operable to transport materials from at least one material source location to a material destination location; and sending at least one command to at least one of the first machine or the third machine because a predicted sequence of processing of materials by a second machine at the material destination location would result in the second machine providing a materials blend with at least one attribute outside of a target range, wherein the predicted sequence of processing is based on:

a predicted sequence of arrival of the first machine and the third machine at the material destination location, or material attribute data indicative of the materials transported by the first machine or the third machine, wherein the at least one command changes an order in which the first machine and the third machine provide materials to the second machine from an order predicted by the predicted sequence of arrival, such that processing of the materials from the first machine and the materials from the third machine results in a materials blend with at least one attribute within the target range.

9. The method of claim 8, wherein each of the first machine and the third machine are within a threshold distance of the material destination location based at least in part on global positioning system (GPS) data from the first machine or the third machine.

10. The method of claim 8, wherein the sending the at least one command changes when at least one of the first machine or the third machine joins a queue of machines at the material destination location.

11. The method of claim 8, wherein the sending the at least one command further comprises sending a command to at least one of the first machine or the third machine to proceed to a dump site at the material destination location.

12. The method of claim 8, wherein the sending the at least one command further comprises sending a command to at least one of the first machine or the third machine to exit the material destination location without dumping the materials.

13. The method of claim 8, wherein the at least one command comprises a command for the first machine to arrive at the material destination location prior to the third machine arriving at the material destination location, or for the third machine to arrive at the material destination location prior to the first machine arriving at the material destination location.

14. The method of claim 8, wherein the first machine comprises a mining truck, and wherein the second machine comprises a crusher.

15. A control system for materials dumping during mining operations, the control system being configured to:

receive, from a first machine and a third machine, telemetry data indicative of operations of the first machine and the third machine, each of the first machine and the third machine being operable to transport materials from at least one material source location a material destination location;

determine a predicted sequence of arrival of the first machine and the third machine at the material destination location based on the telemetry data and determine a score for the predicted sequence of arrival;

determine a predicted sequence of processing of the materials by a second machine at the material destination location based on:

material attribute data indicative of the materials transported by the first machine and the third machine, the predicted sequence of arrival, and the score for the predicted sequence of arrival;

determine that the predicted sequence of processing violates at least one prohibited sequence of processing for the second machine because a blend of material produced by the second machine processing the materials from the first machine and from the third machine would have at least one property outside of a target range; and send at least one command to at least one of the first machine and the third machine because the predicted sequence of processing violates the at least one prohibited sequence of processing, the at least one command providing a sequence of arrival of the first machine and the third machine at the material destination location different than the predicted sequence of arrival, wherein the at least one command is an order to change the predicted sequence of arrival of the first machine and the third machine at the second machine, such that the processing by the second machine of the materials transported by the first machine and the materials transported by the third machine results in a material that has the at least one property within the target range.

16. The control system of claim 15, wherein the telemetry data includes global positioning system (GPS) data from the first machine and the third machine.

17. The control system of claim 15, further configured, when determining the predicted sequence of processing, to determine the predicted sequence of processing for the first machine and the third machine when the first machine and the third machine join a queue of machines at the material destination location.

18. The control system of claim 15, further configured, when sending the at least one command, to send a command to at least one first machine or the third machine to proceed to a dump site at the material destination location.

19. The control system of claim 15, further configured, when sending the at least one command, to send a command to at least one first machine or the third machine to exit the material destination location without dumping the materials.

20. The control system of claim 15, wherein the at least one command comprises for the first machine to arrive at the material destination location prior to the third machine arriving at the material destination location, or for the third machine to arrive at the material destination location prior to the first machine arriving at the material destination location.

* * * * *